(12) United States Patent
Quintin

(10) Patent No.: US 12,025,017 B2
(45) Date of Patent: Jul. 2, 2024

(54) LOADED BEARING SYSTEM

(71) Applicant: PRATT & WHITNEY CANADA CORP., Longueuil (CA)

(72) Inventor: Hugo Quintin, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 129 days.

(21) Appl. No.: 17/649,697

(22) Filed: Feb. 2, 2022

(65) Prior Publication Data

US 2023/0243276 A1    Aug. 3, 2023

(51) Int. Cl.
*F01D 25/16*    (2006.01)
*F16C 19/54*    (2006.01)
*F16C 33/60*    (2006.01)

(52) U.S. Cl.
CPC ............. *F01D 25/16* (2013.01); *F16C 19/54* (2013.01); *F16C 33/60* (2013.01); *F16C 2360/23* (2013.01)

(58) Field of Classification Search
CPC .......... F01D 25/16; F16C 19/54; F16C 33/60; F16C 39/04; F16C 2360/23
See application file for complete search history.

(56) References Cited

U.S. PATENT DOCUMENTS

| | | | | |
|---|---|---|---|---|
| 4,159,888 A * | 7/1979 | Thompson | ............... | F01D 25/18 415/105 |
| 5,051,005 A * | 9/1991 | Duncan | .................... | F16C 25/08 384/517 |
| 5,836,739 A | 11/1998 | Haramura et al. | | |
| 6,048,101 A * | 4/2000 | Rasmussen | ........... | F16C 25/083 384/616 |
| 8,403,566 B2 * | 3/2013 | Koda | .................... | F16C 33/768 384/571 |
| 9,464,669 B2 * | 10/2016 | Kerr | .................... | F16C 33/6677 |
| 9,897,140 B2 | 2/2018 | Gorajski et al. | | |

(Continued)

FOREIGN PATENT DOCUMENTS

| | | |
|---|---|---|
| EP | 3020507 A1 | 5/2016 |
| EP | 3816411 A1 | 5/2021 |
| GB | 1170382 A | 11/1969 |

OTHER PUBLICATIONS

European Search Report issued in counterpart application 23154793.6 dated Jul. 6, 2023.

*Primary Examiner* — David E Sosnowski
*Assistant Examiner* — Aye S Htay
(74) *Attorney, Agent, or Firm* — NORTON ROSE FULBRIGHT CANADA LLP

(57) ABSTRACT

A bearing system for supporting a shaft, comprising: a bearing including: an inner race about an axis, the inner race having an interior coupled to the shaft; rolling elements about the axis and around the inner race; and an outer race about the axis and around the rolling elements; a housing having a cavity defining an axial location relative to the axis, the bearing received by the cavity; a first axial loading structure in the cavity and operatively connected to the bearing; and a second axial loading structure in the cavity extending axially away from the axial location in a first axial direction, the second loading structure opposing movement of the bearing relative to the axial location in a second axial direction when the bearing loads the second axial loading structure in the second axial direction, the first and second axial loading structures operationally independent from one another.

15 Claims, 5 Drawing Sheets

(56) References Cited

U.S. PATENT DOCUMENTS

| | | | |
|---|---|---|---|
| 10,458,277 B1* | 10/2019 | Von Berg | F16C 27/045 |
| 10,655,499 B2* | 5/2020 | Duffy | F16C 27/08 |
| 10,753,391 B1 | 8/2020 | Smedresman | |
| 11,021,994 B2 | 6/2021 | Cartier | |
| 11,118,629 B2 | 9/2021 | Witlicki et al. | |
| 11,466,588 B2 | 10/2022 | Kiely et al. | |
| 11,629,648 B2 | 4/2023 | Friedberg et al. | |
| 2008/0187265 A1* | 8/2008 | Koda | F16C 19/525 |
| | | | 384/563 |
| 2016/0069385 A1* | 3/2016 | Kim | B23Q 1/265 |
| | | | 384/479 |
| 2017/0122369 A1* | 5/2017 | Smedresman | F16C 27/045 |
| 2020/0080445 A1* | 3/2020 | Gysling | F16C 27/045 |

* cited by examiner

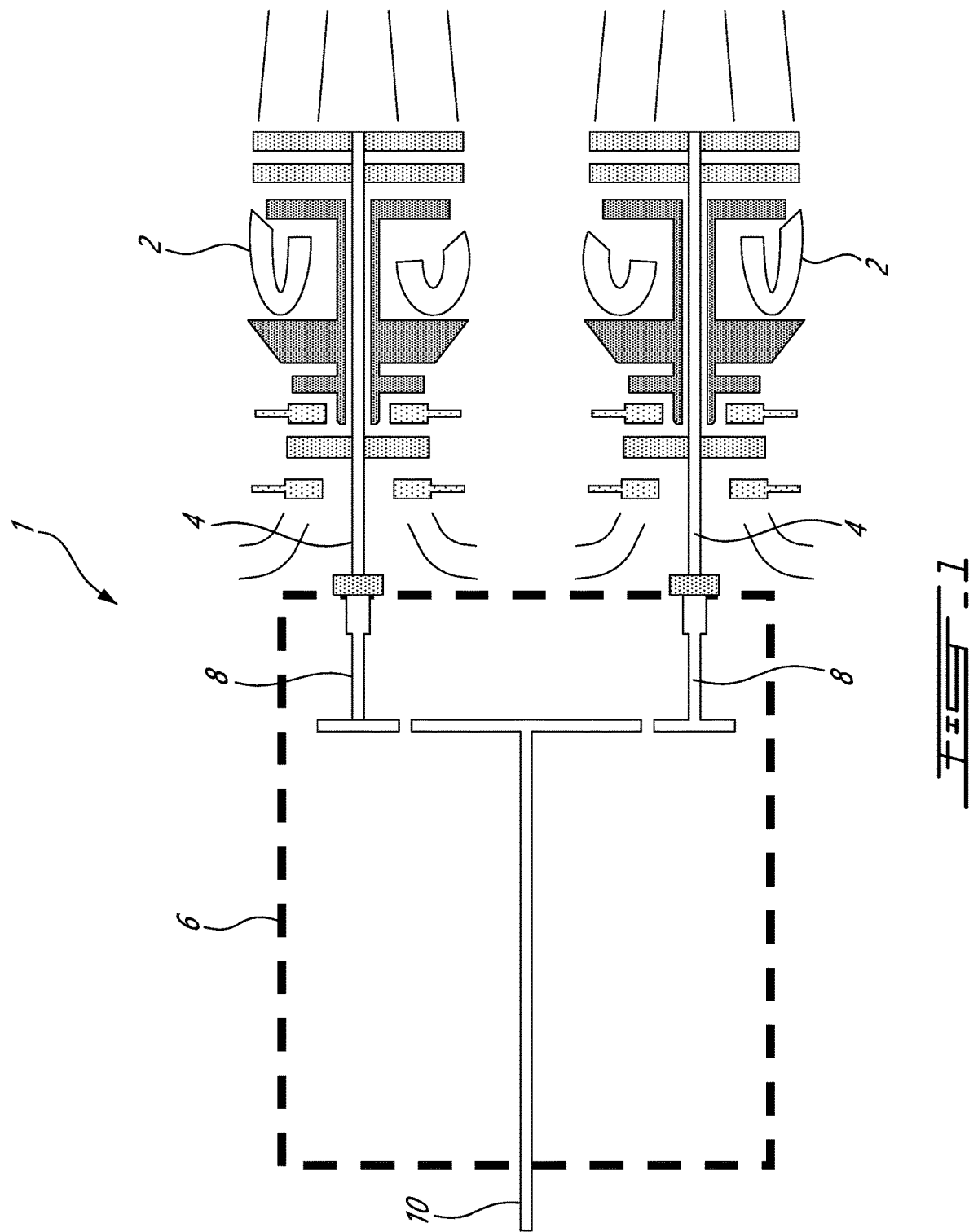

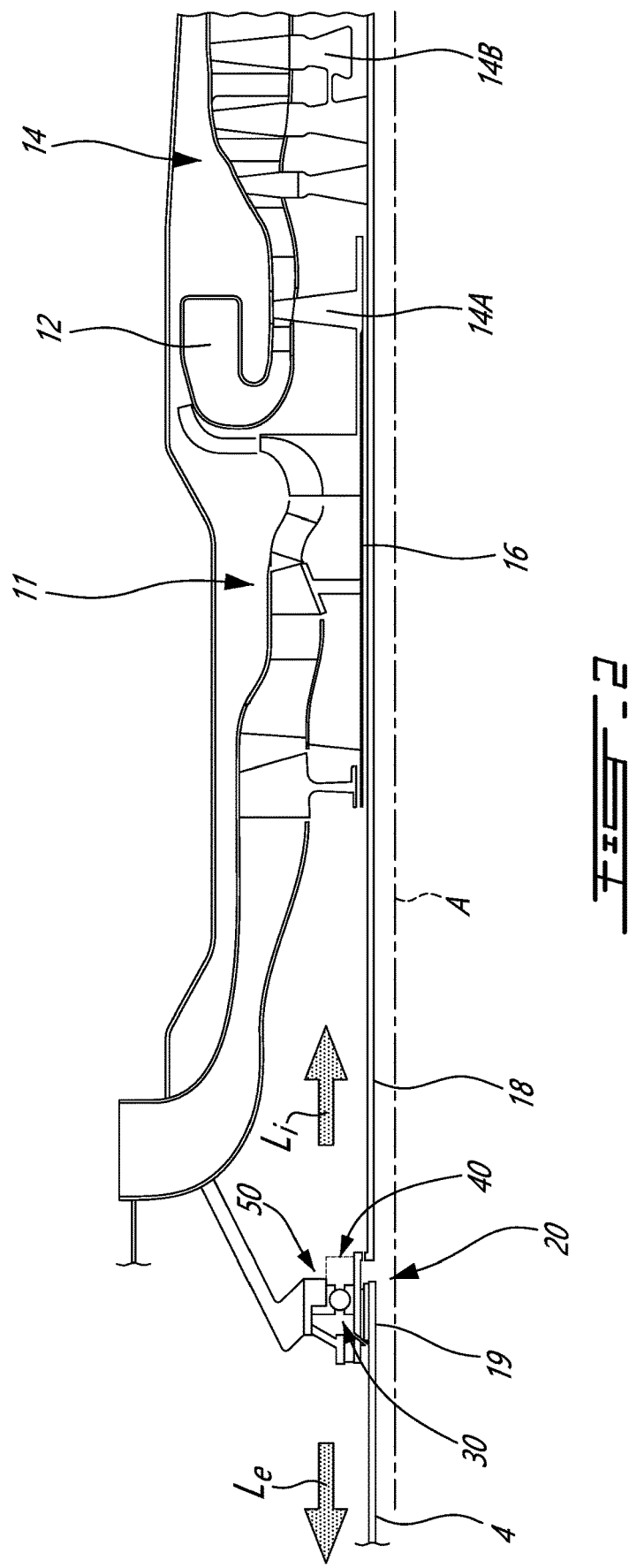

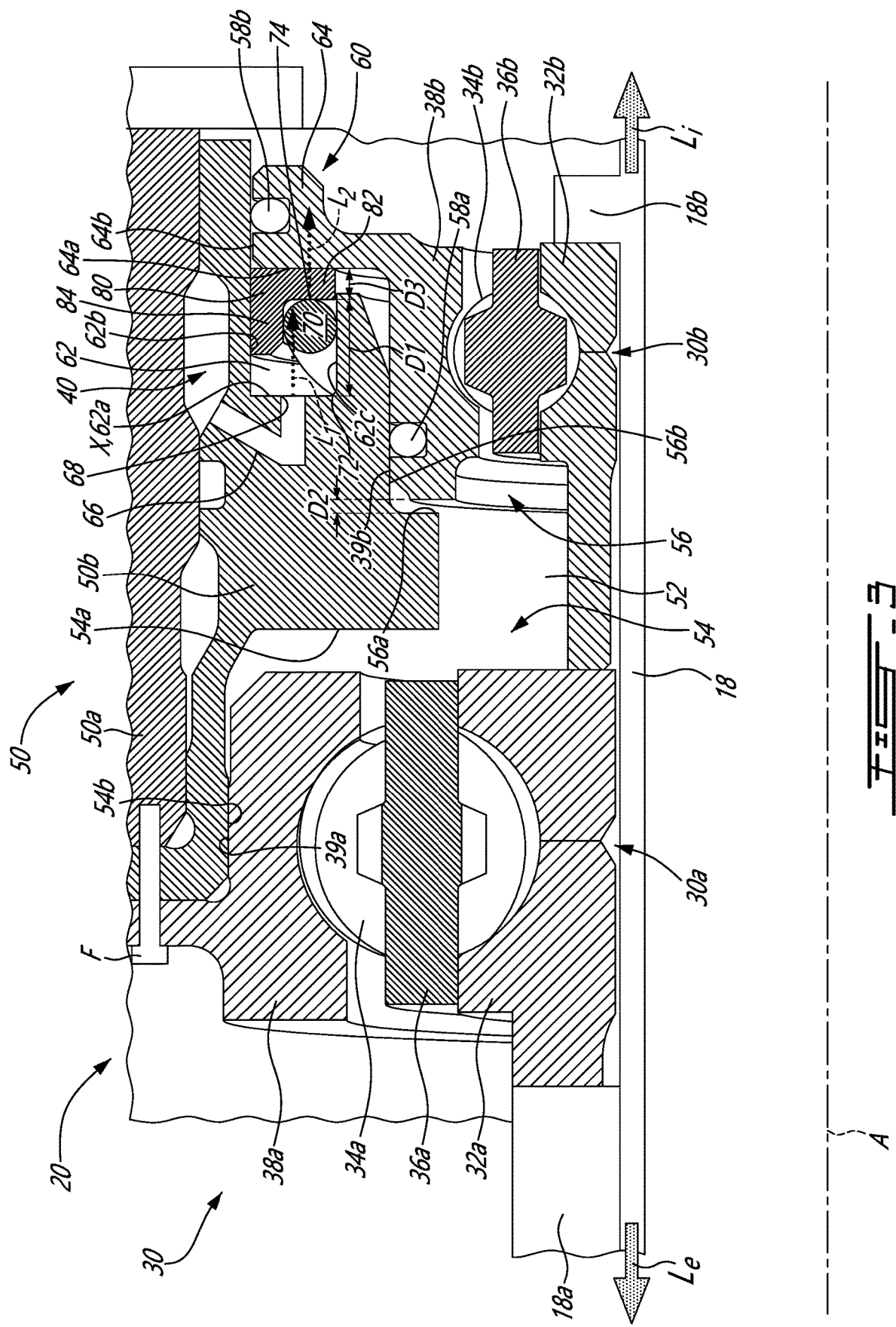

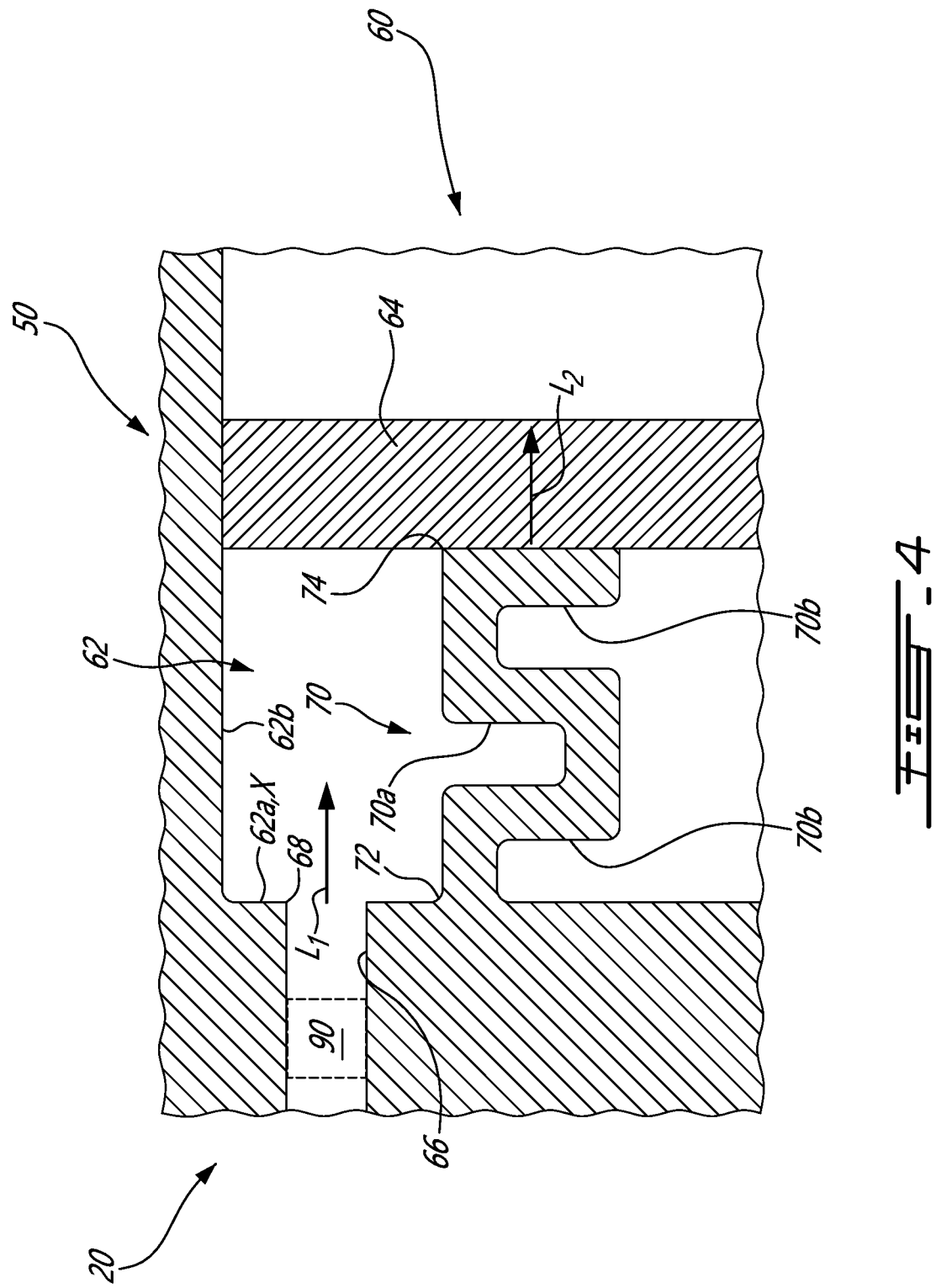

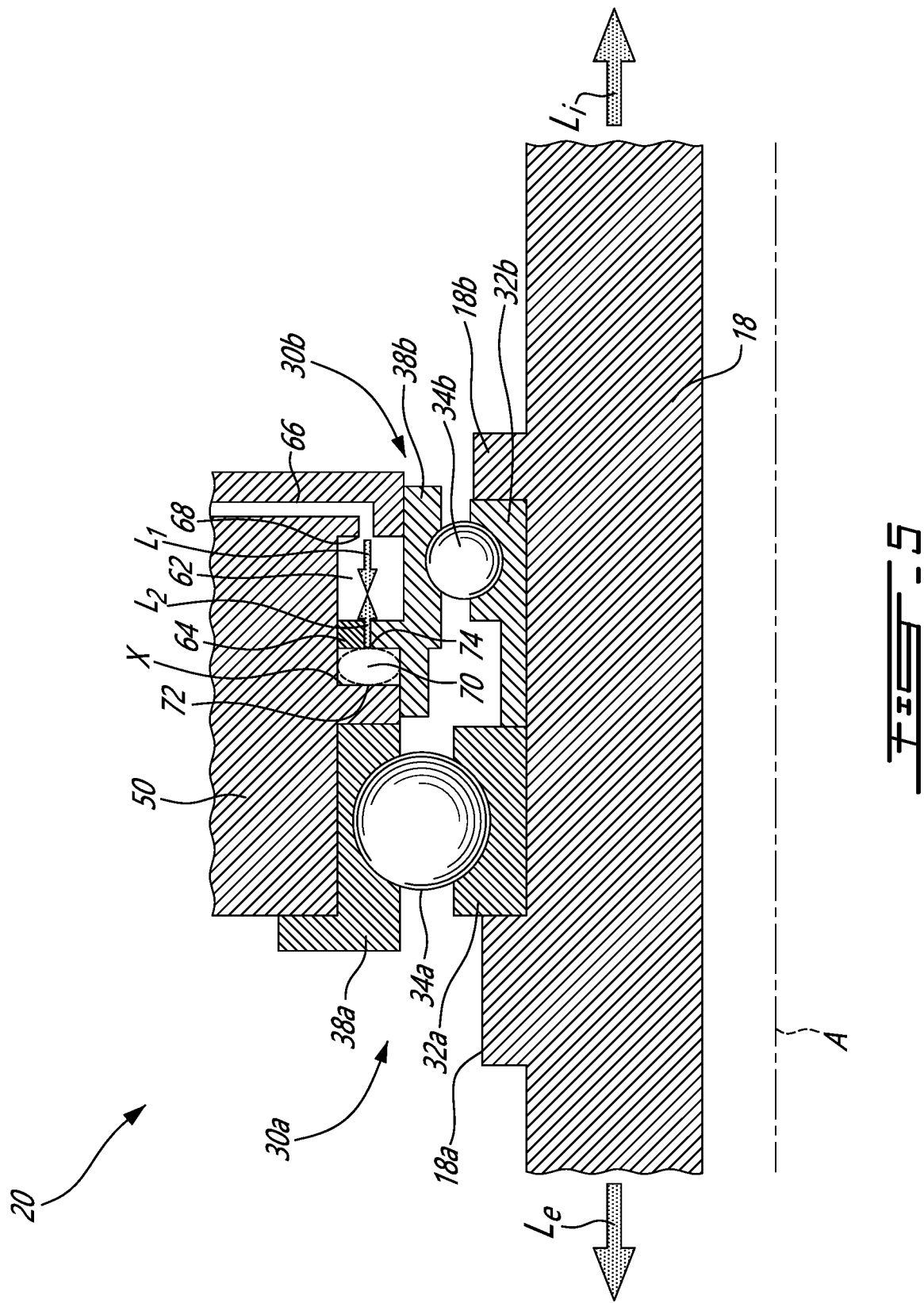

LOADED BEARING SYSTEM

TECHNICAL FIELD

The application relates generally to bearings and, more particularly, to axially-loaded bearings.

BACKGROUND OF THE ART

Bearings are used in powerplants to support rotatable components. In multi-powerplant aircraft, such as helicopters, one such rotatable component may be a shaft such as a common load shaft driven by a plurality of powerplants via a common gearbox, or a turbine shaft of either of the powerplants. Each of the powerplants is typically sized to provide power greater than what is required for cruising. Bearings supporting the turbine shafts are thus typically suited for resisting various axial loads coming from the gearbox and the turbine under high power output operating conditions. It can however be desirable to operate one of the powerplants at a lower power output during cruise (i.e., an idle cruise regime, or ICR) in order to reduce overall energy consumption. Hence, a number of considerations must be taken into account for rotatable components to be suitably supported upon operation of the powerplants across a range of power outputs.

SUMMARY

In accordance with an aspect of the present technology, there is provided a bearing system for supporting an engine shaft, the bearing system comprising: a bearing including: an inner race extending circumferentially about an axis, the inner race having an interior sized to be coupled to the engine shaft; a series of rolling elements disposed circumferentially about the axis and around the inner race; and an outer race extending circumferentially about the axis and around the series of rolling elements; a housing having a housing cavity about the axis, the housing cavity defining an axial location relative to the axis, the bearing received by the housing cavity; a first axial loading structure disposed in the housing cavity and operatively connected to the bearing; and a second axial loading structure disposed in the housing cavity, the second axial loading structure extending axially away from the axial location in a first axial direction, the second loading structure opposing axial movement of the bearing relative to the axial location in a second axial direction opposite the first axial direction when the bearing axially loads the second axial loading structure in the second axial direction, the first and the second axial loading structures being operationally independent from one another.

In accordance with another aspect of the present technology, there is provided a bearing system for supporting an engine shaft, the bearing system comprising: a bearing including: an inner race extending circumferentially about an axis, the inner race having an interior sized to be coupled to the engine shaft; a series of rolling elements disposed circumferentially about the axis and around the inner race; an outer race extending circumferentially about the axis and around the series of rolling elements; and a flange projecting radially outward of the outer race; a housing having a housing cavity about the axis, the housing cavity defining an axial location relative to the axis, the bearing received by the housing cavity, the housing cavity including a piston chamber located radially outward of the outer race, the flange extending radially outwardly to inside the piston chamber; a biasing member disposed in the housing cavity, the biasing member extending axially away from the axial location in a first axial direction, the biasing member arranged for opposing axial movement of the outer race relative to the axial location in a second axial direction opposite the first axial direction.

In accordance with another aspect of the present technology, there is provided a turbine engine comprising: a first and a second bearing about an axis, the first and the second bearing respectively including: a first and a second inner race extending circumferentially about the axis; a first and a second series of rolling elements disposed circumferentially about the axis and around the first and the second inner races respectively; a first and a second outer race extending circumferentially about the axis and around the first and the second series of rolling elements respectively; and a flange projecting radially outwardly from the second outer race; a shaft about the axis, the shaft having a pair of abutments axially spaced from one another, the first and the second inner races mounted to the shaft adjacent to one another between the abutments such that each of the first and the second inner race is axially bound; a housing having a housing cavity about the axis defining an axial location relative to the axis, the first and second bearings received by the housing cavity, the housing cavity including a piston chamber located radially outward of the second outer race, the flange extending radially outwardly to inside the piston chamber; a biasing member disposed in the housing cavity, the biasing member extending axially away from the axial location in a first axial direction, the biasing member arranged for opposing axial movement of the second outer race relative to the axial location in a second axial direction opposite the first axial direction.

DESCRIPTION OF THE DRAWINGS

Reference is now made to the accompanying figures in which:

FIG. 1 is a schematic cross-sectional view of a multi-powerplant system;

FIG. 2 is a schematic cross-sectional view of an engine of the multi-powerplant system of FIG. 1, FIG. 3 is a cross-sectional view of a bearing system of the multi-powerplant system of FIG. 1 in accordance with an embodiment;

FIG. 4 is a partial, cross-sectional view of another bearing system in accordance with another embodiment; and FIG. 5 is a cross-sectional view of another bearing system in accordance with another embodiment.

DETAILED DESCRIPTION

FIG. 1 illustrates a schematic representation of an exemplary multi-powerplant system 1 that may be used to power an aircraft. The multi-powerplant system 1 comprises two or more powerplants 2. In certain embodiments, the multi-powerplant system 1 is a hybrid system including at least one powerplant being an internal combustion engine (ICE) such as a gas turbine engine and at least one powerplant being an electric motor. In addition to airborne applications, the multi-powerplant system 1 may be used in marine or industrial applications. In the depicted embodiments, the multi-powerplant system 1 includes a pair of powerplants 2 being gas turbine engines of the turboshaft type, and will henceforth be referred to as engine system 1 and engines 2, respectively. Each engine 2 has an engine output shaft 4 connected to a common gearbox 6 by a respective connector shaft 8 to drive a common load shaft 10 that is connected to a bladed rotor (not shown).

Each of the engines 2 is drivingly coupled to the common load shaft 10 via the gearbox 6, which may be of a speed-reduction type. The gearbox 6 may be configured to permit the common load shaft 10 to be driven by either of the engines 2 alone, or by a combination of both engines 2 operating together. During idle cruise regime (ICR) operation of the engine system 1, one engine 2 is idle, or in standby, to reduce energy consumption while the other engine 2 is operated to deliver motive power. For example, ICR may be selected during operation of an aircraft equipped with a dual ICE engine system 1 to reduce energy consumption during cruise operation, whereas all engines 2 may be operated with full power during takeoff, landing or during an emergency situation. For aircraft equipped with a hybrid engine system 1, ICR may be selected for the operating the ICE in standby as the electric motor is relied on for providing most, if not all, of the power required for operating the aircraft, for example during takeoff or landing.

Although the forthcoming description refers to aircraft applications equipped with an engine system 1 of the dual ICE type, it shall be understood that it applies, mutatis mutandis, to other types of aircraft and engine system types such as those mentioned hereinabove. Hence, the present description generally relates to the engine system 1 and to the operation thereof such that a first one of the engines 2 may operate to provide most of the motive power to the aircraft, whereas a second one of the engines 2 may operate in idle to reduce energy consumption while remaining on standby, or reserve, to be available in case additional motive power is needed. Such operation of the engine system 1 may be described as an asymmetric operating mode or regime. Stated otherwise, during asymmetric operation, one engine (i.e., an active engine) is operated in a high-power, active mode and the other engine (i.e., a standby engine) is operated in a low-power, standby mode.

Referring to FIG. 2, the engine 2 of the engine system 1 generally includes, in serial flow communication, a compressor section 11 for pressurizing the air, a combustor 12 wherein the compressed air is mixed with fuel and ignited for generating an annular stream of hot combustion gases, and a turbine section 14 for extracting energy from the combustion gases. A high-pressure turbine 14A drives a high-pressure turbine shaft 16 to which the compressor section 11 is connected. A low-pressure turbine 14B drives a low-pressure turbine shaft 18 which is coaxial with the high-pressure turbine shaft 16. A bearing system 20 of the engine 2 supports the low-pressure turbine shaft 18 about an axis A. The bearing system 20 includes at least one bearing 30 as well as a loading system 40, specifics of which will be detailed hereinbelow. The bearing system 20 also includes a housing 50 holding the at least one bearing 30 with respect to a carcass of the engine 2. A sliding spline joint connects the engine output shaft 4 and the low-pressure shaft 18.

During operation of the engine 2, the bearing system 20 is subjected to axial loads originating from within the engine 2 (i.e., an internal axial load schematically shown by arrow Li) and from outside the engine 2 (i.e., an external axial load schematically shown by arrow Le). The internal axial load Li, also called axial aerodynamic load, refers to a load corresponding to all axial loads imposed by the low-pressure turbine and/or compressor sections of the engine 2. The external axial load Le, also called chucking load, refers to a load corresponding to all axial loads imparted to the bearing system 20 via the engine output shaft 4 and/or via the housing 50, which may originate from the gearbox 6, the common load shaft 10 and/or the bladed rotor. It shall be understood that the loads Li, Le are vibratory in nature, and therefore their magnitude and direction may vary over time. The internal axial load Li is typically unidirectional, whereas the external axial load Le is typically bidirectional. The loads Li, Le may be said to amount to an effective load borne by the bearing system 20. Although variations in the effective load are typical, maintaining the effective load within a target load range, or margin, may be favorable to the service life of a component of interest of the bearing system 20. Under certain circumstances, a change to either load Li, Le may cause the effective load to fall outside of the target load range either forwardly or rearwardly, i.e., may impart the component of interest with an extra-marginal load that is either forward or rearward.

Depending on the operating mode of the engine 2, the loads Li, Le may vary in amplitude. For instance, the internal axial load Li is typically substantially greater in the active mode than in the standby mode. Under certain circumstances, in the standby mode, the component of interest of the bearing system 20 engine can be practically free of any internal axial load Li, while remaining subjected to a substantial external axial load Le. In the present embodiment, the internal axial load Li is directed rearwardly and thus, in the standby mode, the component of interest is subjected to a extra-marginal load that is directed forwardly. It is contemplated that in other embodiments, the component of interest may be subjected to an extra-marginal load in the active mode, and/or to an extra-marginal load that is directed rearwardly. As will be described in greater detail hereinbelow, the bearing system 20 is provided with the loading system 40 as a means for imparting the component of interest with a compensatory load suitable for compensating the extra-marginal load. To wit, the compensatory load and the extra-marginal load would amount to an overall load falling within the target load range.

With regard to FIGS. 3 to 5, exemplary embodiments of the bearing system 20 will now be described. Referring to the embodiment of FIG. 3, the bearing system 20 includes a pair of bearings 30 about the axis A, namely a main bearing 30a and an auxiliary bearing 30b. The main and auxiliary bearings 30a, 30b respectively include an inner race 32a, 32b extending circumferentially about the axis A and mounted to the low-pressure shaft 18, a series of rolling elements 34a, 34b disposed circumferentially about the axis A and around the inner race 32a, 32b, an annular cage 36a, 36b shaped for maintaining each rolling element of the series of rolling elements 34a, 34b in a suitable spatial relationship relative to one another, and an outer race 38a, 38b extending circumferentially about the axis A and around the series of rolling elements 34a, 34b. In embodiments, the outer race 38a of the main bearing 30a is axially bound relative to the housing 50, for example by way of a fastener F, whereas the outer race 38b of the auxiliary bearing 30b is axially free relative to the housing 50. Each one of the bearings 30 is an axial bearing, i.e., a bearing that can withstand axial loads and transfer such axial loads internally to and from its components. For instance, imparting an axial load to the outer race 38a, 38b, can axially load the rolling elements 32a, 32b, the annular cage 36a, 36b, and the inner race 32a, 32b, and vice versa. Several types of suitable axial bearings exist, such as ball bearings (as depicted), tapered roller bearings or the like. Moreover, the inner races 32a, 32b are axially bound relative to one another and to the low-pressure shaft 18, such that axial loads can be transferred from the shaft 18 to one bearing 30 and/or from one bearing 30 to another. The low-pressure shaft 18 has a pair of abutments axially spaced from one another, between which the inner races 32a, 32b are axially held in place. In the embodiment shown, a first one of the abutments is an axial fastener 18a, in this case a nut, fastened to the shaft 18, and a second one of the abutments is a shoulder 18b being an integral part of the shaft 18. As shown, the inner race 32a of the main bearing 30a abuts the axial fastener 18a, the inner race 32b of the auxiliary bearing 30b abuts the shoulder 18b, and the inner races 32a, 32b abut one another. It is contemplated that the inner races 32a, 32b could be axially bound otherwise. For instance, additional components could be located between the inner races 32a, 32b or between any one of the inner races 32a, 32b and a corresponding one of the abutments adjacent thereto. In this embodiment, the rolling elements 34a of the main bearing 30a and the rolling elements 34b of the auxiliary bearing 30b are sized differently. The rolling elements 34b are of a size (in this case a diameter) that is smaller than that of the rolling elements 34a, and the auxiliary bearing 30b is located rearward of the main bearing 30a. In other embodiments, the auxiliary bearing 30b is located forward of the main bearing 30a. In some embodiments, the rolling elements 34a, 34b are of a same size. In some embodiments, the main bearing 30a is a ball bearing and the auxiliary bearing 30b is a tapered roller bearing.

In this embodiment, the housing 50 includes a first housing structure 50a and a second housing structure 50b that are axially bound relative to one another, for example by way of the fastener F. It is contemplated that in other embodiments, the housing 50 may be formed of a sole structure. The housing 50, and in this case the second housing structure 50b, defines a housing cavity 52 about the axis, through which the shaft 18 extends and by which the bearings 30 are received. The housing cavity 52 includes a main cavity 54 receiving the main bearing 30a and an auxiliary cavity 56 receiving the auxiliary bearing 30b. The main and auxiliary cavities 54, 56 are respectively defined by radially extending axial housing surfaces 54a, 56a on either side of a housing flange of the housing 50 that extends radially between the cavities 54, 56, although such housing flange may be omitted in certain embodiments. Radially inner housing surfaces 54b, 56b of the housing 50 respectively circumscribe portions of the main and auxiliary cavities 54, 56 sized for receiving radially outer surfaces 39a, 39b of the outer races 38a, 38b. The outer race 38b sealingly engages the radially inner housing surface 56b, in this case by way of a sealing element 58a. The outer race 38b defines a groove radially inward of the corresponding radially outer surface 39b, from which the sealing element 58a extends radially outwardly to sealingly engage the radially inner housing surface 56b. The sealing element 58a is constructed of an elastomeric material and has a toroidal shape, although various other suitable materials and shapes are possible. In some embodiments, the groove and the sealing element 58a are omitted.

The loading system 40 generally includes a powered loading means or member, also referred to as a first axial loading structure, suitable for imparting the compensatory load to the component of interest, such as a hydraulically-powered actuator, a pneumatically-powered actuator or even an electrically-powered actuator. In embodiments, the first axial loading structure is provided in the form of an oil piston 60. The oil piston 60 is operatively connected to a component of the bearings 30 that may be referred to as an effector component. Due to the axial load-bearing nature of the bearings 30 and to the aforementioned axial binding of the bearings 30 relative to one another and to the shaft 18, several arrangements of the oil piston 60 are possible for imparting the compensatory load to the component of interest, either directly (i.e., the component of interest being the effector component) or indirectly (i.e., the component of interest and the effector components being different components). In this embodiment, the effector component is the outer race 38b of the auxiliary bearing 30b. The component of interest is a component of the main bearing 30a and may thus be said to be indirectly loaded. The oil piston 60 is supplied with oil by an oil system of the engine 2 and is configured such that upon a main oil pressure (MOP) of the oil system being at a rated value, the oil piston 60 exerts a first axial load L1 (also referred to as a hydraulic load) corresponding to the compensatory load onto the bearings 30. The oil piston 60 generally includes a piston chamber 62, a piston head 64 slidably received by the piston chamber 62 and an oil line 64 having an oil orifice 66 providing fluid communication between the oil system and the piston chamber 62. The piston head 64 is linked to the effector component such that the piston head 64 moving axially by a given distance axially moves the effector component by a same distance.

In the present embodiment, the piston chamber 62 is a portion of the housing cavity 52. The piston chamber 62 is thus defined by an axial chamber surface 62a and an outer chamber surface 62b of the housing 50. The axial chamber surface 62a extends radially outwardly relative to the axis A, and faces axially in a direction corresponding to that desired for the compensatory load, in this case rearwardly. It should be noted however that in other embodiments, the axial chamber surface 62a may be shaped otherwise, and could for example be curved or tapered instead of planar. The outer chamber surface 62b extends circumferentially about the axis A and radially outwardly circumscribes the piston chamber 62. An inner chamber surface 62c of the housing 50 radially inwardly circumscribes the piston chamber 62, such that the piston chamber 62 may be described as an annular groove of the housing 50. In this embodiment, the piston chamber 62 is located radially outward of the auxiliary cavity 56. The inner chamber surface 62c is a radially outer surface of a housing ridge of the housing 50 that extends axially at a radial location between the auxiliary cavity 56 and the piston chamber 62. In other embodiments, the housing ridge is omitted, such that the piston chamber 62 and the auxiliary chamber 56 form a sole cavity. In some such embodiments, the axial chamber surface 62a extends radially from the outer chamber surface 62b to the radially inner housing surface 56b.

The piston head 64 is a flange-like structure projecting radially outwardly from the outer race 38b of the auxiliary bearing 30b into the piston chamber 62. The piston head 64 and the outer race 38b form an integral piece, although it does not have to be the case. An axial flange surface 64a of the piston head 64 faces the axial chamber surface 62a, whereas an outer flange surface 64b of the piston head 64 slidably and sealingly engages the outer chamber surface 62b. In the present embodiment, the outer flange surface 64b sealingly engages the outer chamber surface 62b by way of a sealing element 58b. The piston head 64 defines a groove radially inward of the outer flange surface 64b, from which the sealing element 58b extends radially outwardly to sealingly engage the outer chamber surface 62b. The sealing element 58b is constructed of an elastomeric material and has a toroidal shape, although various other suitable materials and shapes are possible. In some embodiments, the groove and the sealing element 58b are omitted. The outer race 38b extends axially from a fore end located inside the auxiliary cavity 56 to an aft end located aft of the housing ridge. The piston head 64 is located proximate to the aft end of the outer race 38b such that it clears the housing ridge as the piston head 64 extends radially outwardly to the piston chamber 62. Depending on the embodiment, the piston head 64 may be located elsewhere with respect to the outer race 38b, for example proximate to the fore end thereof (FIG. 5).

In operation, the oil system of the engine 2 supplies oil to the piston chamber 62 which, upon the MOP being at the rated value, pressurizes the piston chamber 62 so as to exert the first axial load L1 onto the piston head 64. From the piston head 64, the first axial load L1 is transmitted to the outer race 38b of the auxiliary bearing 30b, which forces its inner race 32b rearwardly against the shoulder 18b. The shoulder 18b being forced rearwardly causes the shaft 18 to force the axial fastener 18a rearwardly against the main bearing 30a via its inner race 32a, ultimately producing the compensatory load onto the component of interest. However, under certain circumstances, the MOP may be lower than the rated value, in which case pressurization of the piston chamber 62 would produce a load falling short of the compensatory load. Such circumstances may be generally referred to as low oil pressure events, and may include for example aircraft manoeuvers causing changes in orientation of the oil system relative to gravity, changes in the pumping effectiveness of the oil system, or even leakage from the oil system.

Still referring to FIG. 3, the loading system 40 also generally includes a biasing means or member, also referred to as a second axial loading structure, suitable for imparting a second axial load L2 to the component of interest. The second axial loading structure has an ability to store and/or transfer energy to impart the second axial load L2 that is independent from a power source of the first axial loading structure, such as the oil system of the engine 2 in the case of the first axial loading structure being a hydraulic actuator such as the oil piston 60. Stated otherwise, the first and the second axial loading structure are operationally independent from one another. The independent nature of the first and second axial loading structures allows for the loading system 40 to impart an axial load to the component of interest across a range of operating conditions of the engine 2. It is contemplated that the second axial loading structure may be implemented as at least one elastically deformable element, a pneumatic actuator or an electric actuator. The second axial loading structure may for example impart the second axial load L2 regardless of the effective load, or impart the second axial load L2 in response to the component of interest being axially loaded against the second axial loading structure as a result of the effective load. Depending on the embodiment, the second axial loading structure may be configured such that the second axial load L2 corresponds to the compensatory load. In other embodiments, the second axial loading structure may be configured such that in presence of a MOP that is lower than the rated value, the second axial load L2 is complementary to the first axial load L1, i.e., the second axial load L2 corresponds to at least a difference between the compensatory load and the first axial load L1.

The second axial loading structure may be non-powered, i.e., passive. A preferred implementation of the second axial loading structure is an elastically deformable element, or spring 70, of a suitable type such as at least one of a wave spring (FIG. 3), a disc (i.e., "Belleville") spring, an elastomeric element and a resilient structure projecting from the housing 50, the latter being integral to the housing 50 (FIG. 4) at least in some embodiments. The spring 70 is located inside the housing cavity 52 and arranged with respect to the bearings 30 such that the component of interest is subjected to the compensatory load despite the MOP being lower than the rated value. The spring 70 extends axially away from an axial location X defined by the housing cavity 52 in a first axial direction, in this case rearwardly relative to the aircraft and toward the piston head 64. The spring 70 is arranged for opposing axial movement of the effector component, in this case the outer race 38b and via the oil piston 64, relative to the axial location X in a second axial direction opposite the first axial direction. The spring 70 may oppose such axial movement when the effector component loads the spring 70 in the second axial direction, for example upon the effective load being in the second axial direction. In this embodiment, the spring 70 is pre-loaded such that it exerts an axial load in the first direction even if the loads Li, Le are substantially balanced or if the effective load is negligible. Also, in this embodiment, the spring 70 is arranged to prevent any axial movement of the outer race 38b in the second axial direction, provided that the effective load is of a typical magnitude. The spring 70 has first and second ends 72, 74 (FIG. 4) spaced axially from one another by an axial distance D1, or length of the spring 70. The first end 72 is held stationary relative to the axial location X. The spring 70 is compressible axially via a compression force exerted onto its second end 74 in the second axial direction, i.e., toward the axial location X, such that the length of the spring 70 may be reduced from a resting length to a shorter, compressed length. Such compression force may be exerted onto the spring 70 via the effector component as a result of the extra-marginal load being exerted onto the component of interest. As the spring 70 compresses, i.e. as the second end 74 is displaced in the second axial direction toward the axial location X, the spring 70 exerts in the first axial direction an opposing load, namely the second axial load L2, that is approximately linearly proportional to the displacement of the second end 74 relative to the axial location X. In other embodiments, the second axial load L2 is a function of the displacement of the second end 74 relative to the axial location X that is not linearly proportional. The spring 70 has a rated compressed length at which the second axial load L2 corresponds to a rated opposing load. In some embodiments, the rated opposing load corresponds to the compensatory load. In some embodiments, upon the spring 70 having the rated compressed length, the housing cavity 52 defines an axial distance D2, or clearance, with respect to the effector component and or movable elements of the loading system 40 such as the piston head 64. In such embodiments, upon the spring 70 being compressed to the rated compressed length, the spring 70 may be further compressed so as to decrease the length by the axial distance D2, thereby increasing the second axial load L2 to a value greater than the rated opposing load. In some embodiments, the spring 70 is sized so as to have the rated compressed length upon the compression force corresponding to a rated extra-marginal load, and to be further compressible so as to oppose the compression force being greater than the rated extra-marginal load.

In embodiments, the oil piston 60 and the spring 70 are structured and arranged such that the loading system 40 operates as a shock absorber. The effective load may under certain circumstances include vibrations, and the loading system 40 may be configured for damping such vibrations, i.e., for dissipating energy resulting from such vibrations which would otherwise be received by the component of interest as kinematic energy. The loading system 40 may also be said to insulate the component of interest from such vibrations.

In this embodiment, the spring 70 is located inside the piston chamber 62 and the axial location X is defined by the axial chamber surface 62a. The location of the spring 70 being in an oil-filled cavity may promote the longevity of the spring 70, for instance by mitigating risks of corrosion and fretting of the spring 70. The oil interfacing with the spring 70 may also have a desirable damping effect on vibration of the spring 70. In other embodiments, the spring 70 could be located elsewhere inside the housing cavity 52, for example inside the auxiliary cavity 56, such that it extends toward the outer race 38b. The axial location X could thus be defined by the axial housing surface 56a or by an annular recess formed into the axial housing surface 56a and sized for receiving the spring 70.

The loading system 40 can include a spacer 80 located in the housing cavity 52 axially adjacent to the spring 70, alongside either the first end 72 or to the second end 74. The spacer 80 is sized axially such that an axial dimension D3 of the spacer 80 fills an axial gap between the spring 70 and the effector component (or another component connected thereto, such as the piston head 64 in this case) upon the bearing system 20 being subjected to an effective load that falls inside of the target load range. As such, the effective load falling outside of the target load range, i.e., the onset of the extra-marginal load, would cause the spring 70 to be loaded via the spacer 80. The spacer 80 can also be sized axially so as to pre-load the spring 70, i.e., such that the spring 70 has a desired compressed length upon the bearing system 20 being subjected to an effective load that falls inside of the target load range. In the embodiment of FIG. 3, the spacer 80 extends axially between the second end 74 of the spring 70 and the axial flange surface 64a of the piston head 64. This location of the spacer 80 between the spring 70 and a movable component of the bearing system 20 may prevent wear of the spring 70. In some embodiments, the spacer 80 can be constructed of a material having a hardness that is less than that of the material of the spring 70. The spacer 80 in this case has an outermost diameter corresponding to a diameter of the outer chamber surface 62b, and an innermost diameter corresponding to a diameter of the inner chamber surface 62c. The spacer 80 has an axial portion 82 defining the axial dimension D3, and a radial portion 84 defining a diameter greater than that of the second end 74 of the spring 70 and projecting axially from the first portion 82 toward the axial location and so as to surround the second end 74 of the spring 70. Other shapes of the spacer 80 are contemplated. In some embodiments, the radial portion 84 is omitted. In other embodiments, the spacer 80 is omitted.

Turning now to FIG. 4, there is shown another embodiment of the bearing system 20, in which the spring 70 is a resilient structure projecting from the housing 50, provided in the form of a radially slotted ring. It should also be noted that the spring 70 and the housing 50 form an integral piece, i.e., the spring 70 is defined by the housing 50. Indeed, in this embodiment, the spring 70 can be described as an annular ridge projecting from the axial housing surface 62a, in which annular radial slots 70a, 70b have been machined. Depending on the embodiment, the resilient structure may be shaped otherwise. For example, the resilient structure may be a diaphragm-like structure, or one or more leg-like projections extending from the axial housing surface 62a either perpendicularly or at an angle. Also, in this embodiment, the oil piston 60 includes a pressure-regulating structure 90 for regulating the pressure generated by the oil system in the piston chamber 62 and thus for regulating the first axial load L1. The pressure-regulating structure 90 can for example be a valve or a restrictor located upstream of the piston chamber 62. Depending on the embodiment, the restrictor may be an insert disposed in the oil line 66 or may be a geometrical feature of the oil line 66. In some embodiments, the restrictor defines the oil orifice 68. The pressure-regulating structure 90 and the spring 70 can be adjusted with respect to one another such that for a given operating mode of the engine 2, the resulting first and second axial loads L1, L2 amount to an effective load that falls within the target load range.

In the embodiments shown in FIGS. 3 and 4, the spring 70 and the oil orifice 68 are located in the piston chamber 62 on a same side of the piston head 64, such that the first axial load L1 and the second axial load L2 act in a same direction. Referring to FIG. 5, there is shown yet another embodiment of the bearing system 20, in which the spring 70 and the oil orifice 68 are located in the piston chamber 62 on opposite sides of the piston head 64, such that the first axial load L1 and the second axial load L2 act in opposite directions. The spring 70, in this case provided in the form of an elastomeric torus, is provided for exerting the second axial load L2 suitable for compensating a sum of the external load Le, the internal load Li and the first axial load L1 upon the engine 2 being either in the standby mode or in the active mode.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the bearing system 20 could include one bearing 30 or more than two bearings 30. Either one or both of the first and the second axial loading structure of the loading system 40 could be operatively connected to an effector component of the bearing system 20 that is not a bearing outer race. Yet further modifications could be implemented by a person of ordinary skill in the art in view of the present disclosure, which modifications would be within the scope of the present technology.

The invention claimed is:

1. A bearing system for supporting an engine shaft, the bearing system comprising:
    a bearing including:
        an inner race extending circumferentially about an axis, the inner race having an interior sized to be coupled to the engine shaft;
        a series of rolling elements disposed circumferentially about the axis and around the inner race; and
        an outer race extending circumferentially about the axis and around the series of rolling elements;
    a flange projecting radially outward of the outer race;
    a housing having a housing cavity about the axis, the bearing received by the housing cavity, the housing cavity circumferentially circumscribed by a radially inner housing surface, the outer race of the bearing sealingly engaged with the radially inner housing surface, a piston chamber located radially outward of the radially inner housing surface, the piston chamber defined circumferentially by an outer piston chamber surface and axially by an axial piston chamber surface, the axial piston chamber surface defining an axial location relative to the axis, the flange extending radially outwardly beyond the radially inner housing surface to inside the piston chamber, the flange carrying a seal at a radially outer circumference thereof, the seal in sealing engagement with the outer piston chamber surface;

a first axial loading structure disposed in the housing cavity and operatively connected to the bearing, the first axial loading structure including a piston head formed by the flange of the outer race; and a second axial loading structure disposed in the piston chamber, the second axial loading structure in axial abutment against the axial piston chamber surface and extending axially away from the axial location in a first axial direction, the second loading structure opposing axial movement of the bearing relative to the axial location in a second axial direction opposite the first axial direction when the bearing axially loads the second axial loading structure in the second axial direction, the first and the second axial loading structures being operationally independent from one another; and a spacer in axial abutment between the second axial loading structure and the flange of the outer race, the spacer having an outer diameter surface in sliding contact with the outer piston chamber surface.

2. The bearing system of claim 1, wherein the housing defines an oil orifice in fluid communication with inside the piston chamber, and the oil orifice and the second axial loading structure are located on a same side of the piston head.

3. The bearing system of claim 1, wherein the housing defines an oil orifice in fluid communication with inside the piston chamber, and the bearing system includes at least one of a valve and a restrictor in fluid communication with the piston chamber via the oil orifice.

4. The bearing system of claim 1, wherein the second axial loading structure is at least one of a wave spring, a disc spring, an elastomeric piece and a resilient structure defined by the housing.

5. The bearing system of claim 1, wherein the piston chamber is defined by an annular groove of the housing extending circumferentially about the axis, the second axial loading structure including a spring received by the annular groove, the flange disposed axially outside of the annular groove, the spacer having a portion axially overlapping the annular groove and the spring.

6. A bearing system for supporting an engine shaft, the bearing system comprising:
 a bearing including:
  an inner race extending circumferentially about an axis, the inner race having an interior sized to be coupled to the engine shaft;
  a series of rolling elements disposed circumferentially about the axis and around the inner race;
  an outer race extending circumferentially about the axis and around the series of rolling elements; and
  a flange projecting radially outward of the outer race;
 a housing having a housing cavity about the axis, the bearing received in the housing cavity, the housing cavity circumferentially circumscribed by a radially inner housing surface, the outer race of the bearing engaged with the radially inner housing surface, a piston chamber located radially outward of the radially inner housing surface, the piston chamber defined circumferentially by an outer piston chamber surface and axially by an axial piston chamber surface, the axial piston chamber surface defining an axial location relative to the axis, the flange extending radially outwardly beyond the radially inner housing surface to inside the piston chamber, the flange carrying a seal at a radially outer circumference thereof, the seal in sealing engagement with the outer piston chamber surface;

a biasing member disposed in the piston chamber, the biasing member in axial abutment against the axial piston chamber surface and extending axially away from the axial location in a first axial direction toward the flange of the outer race, the biasing member arranged for opposing axial movement of the outer race relative to the axial location in a second axial direction opposite the first axial direction; and a spacer axially trapped between the biasing member and the flange, the spacer having an outer diameter surface in sliding contact with the outer piston chamber surface.

7. The bearing system of claim 6, wherein the housing defines an oil orifice in fluid communication with inside the piston chamber, and the oil orifice and the biasing member are located on a same side of the flange.

8. The bearing system of claim 6, wherein the housing defines an oil orifice in fluid communication with inside the piston chamber, and the bearing system includes at least one of a valve and a restrictor in fluid communication with the piston chamber via the oil orifice.

9. The bearing system of claim 6, wherein the biasing member is at least one of a wave spring, a disc spring, an elastomeric element and a resilient structure projecting from the housing.

10. The bearing system of claim 9, wherein the biasing member and the housing form an integral piece.

11. The bearing system of claim 6, wherein the piston chamber is defined by an annular groove of the housing extending circumferentially about the axis, the biasing member received by the annular groove, the flange disposed axially outside of the annular groove, the spacer having a portion axially overlapping the annular groove.

12. A turbine engine comprising:
 a first and a second bearing about an axis, the first and the second bearings respectively including:
  a first and a second inner race extending circumferentially about the axis;
  a first and a second series of rolling elements disposed circumferentially about the axis and around the first and the second inner races respectively;
  a first and a second outer race extending circumferentially about the axis and around the first and the second series of rolling elements respectively; and
  a flange projecting radially outwardly from the second outer race;
 a shaft about the axis, the shaft having a pair of abutments axially spaced from one another, the first and the second inner races mounted to the shaft adjacent to one another between the abutments such that each of the first and the second inner race is axially bound;
 a housing having a housing cavity about the axis, the first and second bearings received in the housing cavity, the housing cavity circumferentially circumscribed by a radially inner housing surface, the second outer race of the second bearing engaged with the radially inner housing surface, a piston chamber located radially outward of the radially inner housing surface, the piston chamber defined circumferentially by an outer piston chamber surface and axially by an axial piston chamber surface, the axial piston chamber surface defining an axial location relative to the axis, the flange extending radially outwardly beyond the radially inner housing surface to inside the piston chamber, the flange carrying a seal at a radially outer circumference thereof, the seal in sealing engagement with the outer piston chamber surface;

a biasing member disposed in the piston chamber, the biasing member in axial abutment against the axial piston chamber surface and extending axially away from the axial location in a first axial direction toward the flange of the second outer race, the biasing member arranged for opposing axial movement of the second outer race relative to the axial location in a second axial direction opposite the first axial direction; and a spacer filling an axial gap (D3) between the biasing member and the flange, the spacer having an outer diameter surface in sliding contact with the outer piston chamber surface.

13. The turbine engine of claim 12, wherein the turbine engine includes an oil system and at least one of a valve and a restrictor in fluid communication between the oil system and the piston chamber.

14. The turbine engine of claim 12, wherein the housing defines an oil orifice in fluid communication with inside the piston chamber, and the oil orifice and the biasing member are located on a same side of the flange.

15. The turbine engine of claim 12, further comprising the spacer disposed in the piston chamber between the biasing member and the flange.

* * * * *